Nov. 27, 1951  J. B. THOMSON  2,576,269
BALL BEARING

Filed Jan. 30, 1946  2 SHEETS—SHEET 1

INVENTOR,
John B. Thomson
BY
Emery, Varney, Whittemore & Dix
ATTORNEYS

Nov. 27, 1951 — J. B. THOMSON — 2,576,269
BALL BEARING
Filed Jan. 30, 1946 — 2 SHEETS—SHEET 2
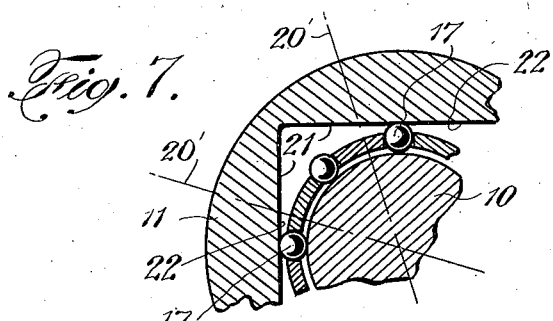
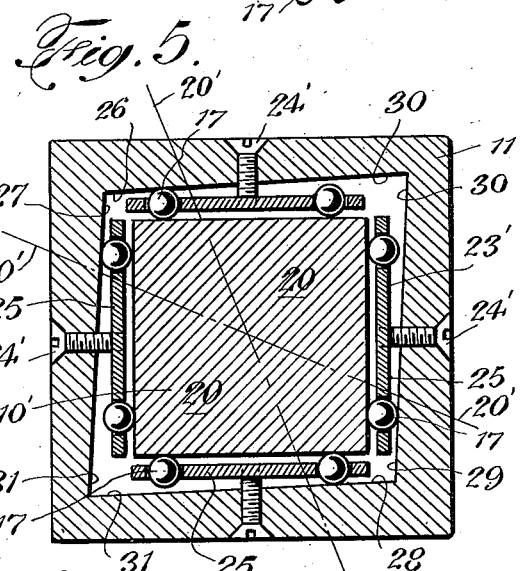
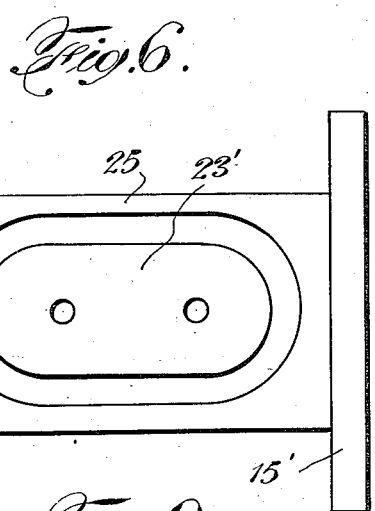
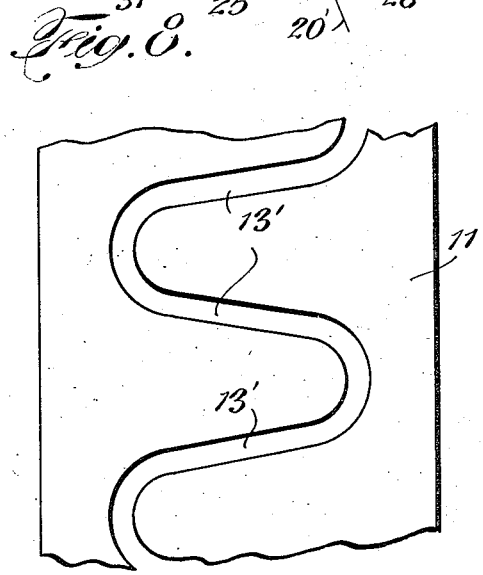
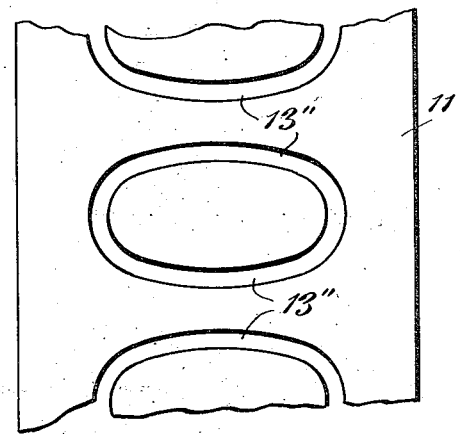
INVENTOR,
John B. Thomson
BY
Emery, Varney, Whittemore & Dix
ATTORNEYS Patented Nov. 27, 1951

2,576,269

UNITED STATES PATENT OFFICE 2,576,269

BALL BEARING

John B. Thomson, Plandome, N. Y.

Application January 30, 1946, Serial No. 644,262

4 Claims. (Cl. 308—6)

This invention relates to improvements in the manufacture of ball-bearings whereof the relative movement of the bearing surfaces is one of translation or reciprocation as distinguished from one of rotation such, for example, as in the case of a shaft longitudinally slidable in its bearing or of a bushing slidable along a fixed shaft.

Some of the present improvements are directed to the production of bearings or bushings of this type which comprise an outer sleeve and a ball-cage or ball-retaining means disposed between the sleeve and the shaft to hold and guide the balls in a channel or circuit which they transverse under operation. One of the problems encountered in the commercial production of such bearings has to do with the form of, or designing of, the interior surface of the sleeve so that the balls in one part of the ball-circuit or circuits will have bearing contact with the sleeve while the balls in the other or ball-return parts of the circuit or circuits will not have bearing contact but will be free to move in either direction as impelled by the balls having bearing contact. The particular difficulty in this respect is to design the interior face of the sleeve in such form that it will not only serve its intended purpose, but which form can be readily manufactured by a comparatively simple operation and therefore without substantial expense.

The other improvements in slidable bearings which are included herein are quite independent of the particular character of the ball-retaining means and of the form of the inner face of the sleeve, and have to do, in one case, with means for preventing relative rotation between the bearing and shaft and, in another, with means for preventing the bearing-balls from developing grooves in the shaft due to constant wear of the latter along the lines traversed by the balls.

Figure 1:
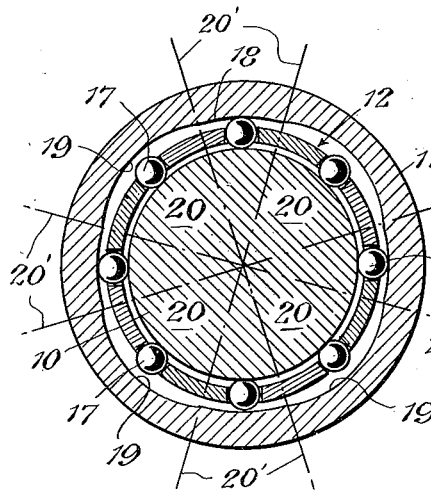
Figure 2:
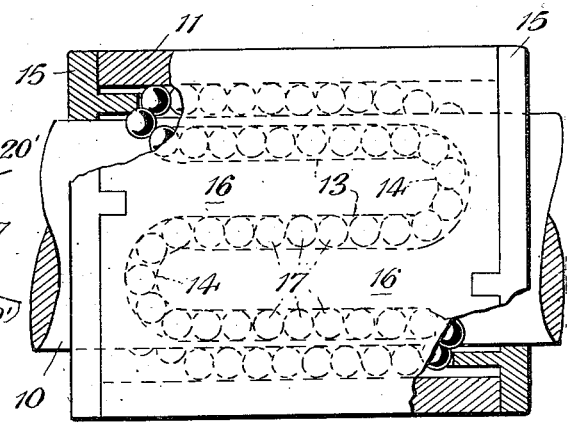
Figure 3:
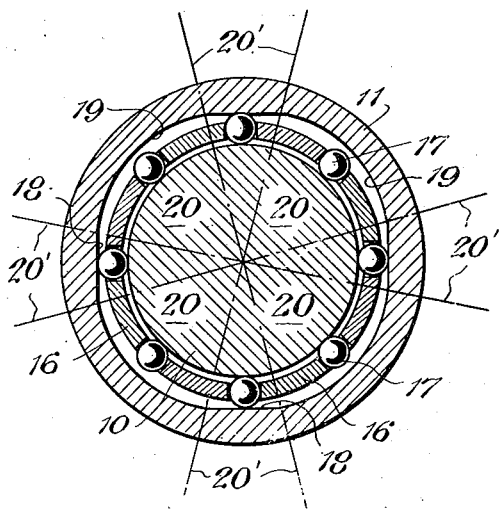
Figure 4:
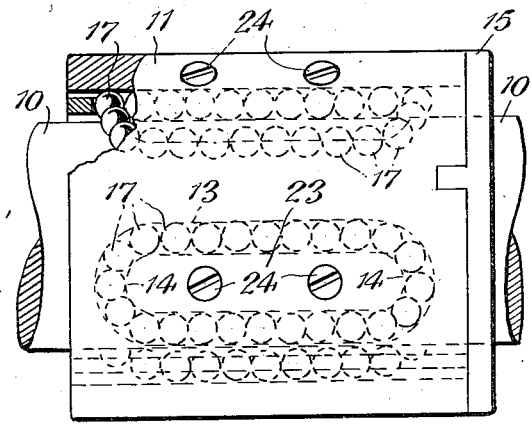

Several embodiments of my improvements are shown in the drawings in which Figs. 1 and 2 are views respectively in transverse section and side elevation of one of these embodiments, Figs. 3 and 4 similar respective views of another embodiment, Fig. 5 a transverse section of still another embodiment, Fig. 6 a detail of part of the structure shown in Fig. 5, Fig. 7 a detail illustrating a modification of the structure shown in Figs. 1 and 2, and Figs. 8 and 9 are diagrammatic views each illustrative of a particular disposition of the ball circuit or circuits in relation to the shaft to prevent the wearing of grooves in the latter.

Referring first to the embodiment shown in Figs. 1 and 2 wherein the shaft 10 to which the bearing is to be applied is a rounded shaft, the numeral 11 denotes the outer sleeve of the bearing and the numeral 12 a ball-cage within the sleeve and embracing the shaft. The ball-cage is slotted to form a single continuous ball-race extending around its periphery and has axially disposed substantially straight portions 13 and curved end portions 14 connecting the ends of adjacent straight portions. Such ball-cage may conveniently comprise two members 15 each having fingers 16 extending into the sleeve from the ends of the latter, thus forming a sinuous ball-race as shown, and which is substantially filled with bearing balls 17. The ends of the two cage members 15 may be keyed to the respective ends of the sleeve to maintain the ball-race in its proper operative relation to the inner surface of the sleeve now to be described.

From Fig. 1 it will be seen that there is an even number (here shown as eight) of straight portions 13 of the ball-race and that the balls in only four of these straight portions have bearing contact with the shaft and sleeve; and also that these balls bear upon relatively narrow bearing surfaces 18 extending from end to end of the inner face of the sleeve, and that between these bearing surfaces the inner face of the sleeve is formed with relatively wide arched portions 19 likewise extending from end to end of the sleeve. And since these bearing surfaces and arched portions extend from end to end of the sleeve they may, as will readily appear, be easily and inexpensively formed by a simple operation, such for example as broaching with a suitably adjusted broaching tool. Thus, when the parts are assembled and the ball-cage members 15 are keyed to the sleeve as shown, one-half the number of straight portions 13 of the ball-race will be in register respectively with the bearing surfaces 18 of the sleeve, and the remaining straight portions and all or substantially all of each curved portion 14 of the ball-race will lie in spaces 20 defined by the arched portions 19 of the sleeve and radial planes (denoted by the broken lines 20') passing through the ends of said arched portions. The result of this is that the balls in one-half of the number of straight portions of the ball-race and in all or substantially all of each curved end portion thereof will not have bearing contact with the shaft and sleeve and will therefore be free to move in either direction as impelled by the balls in the other straight portions of the ball-race. It is unnecessary that the arched portions of the sleeve shall be curvilinear in cross-section as shown at 19 in Fig. 1, or that the boundaries between these arched portions and bearing portions of the sleeve shall appear sharp and distinct as shown in that figure. Fig. 7, for example, illustrates a pointed arch formation having plane surfaces 21 which may be said to blend imperceptibly into the narrow bearing surfaces 22 of that figure, since these surfaces 22 are merely extensions of the plane surfaces 21 and hence, for the purpose served by my invention, the surfaces 21 between the radial planes denoted by the lines 20' are deemed to constitute arched portions of the inner face of the sleeve.

In Figs. 3 and 4, the ball-cage is slotted to form a plurality of (here shown as four) closed oval-shaped, that is, oblong ball-races each having two substantially straight axially disposed portions 13 and two curved end portions 14 connecting the straight portions at each end thereof. And, as in the case of the embodiment shown in Figs. 1 and 2, one-half the number of straight portions of the races are in register respectively with the bearing surfaces 18 of the inner face of the sleeve 11, while the other straight portions and all or substantially all of each curved end portion of the races lie within spaces 20 defined by the arched portions 19 of the sleeve and radial planes (denoted as before by lines 20') passing through the ends of said arched portions. The ball-cage 15 may be held in proper operative relation to the sleeve by being keyed to one end of the sleeve as shown, the cut-out pieces 23 thereof, which are produced by the slotting, being secured separately to the sleeve in proper positions to form the several ball-races, by screws 24.

Figs. 5 and 6 show how my invention may be applied to a shaft having flat faces such as a rectangular shaft 10'. As applied to a rectangular shaft the ball-cage may comprise four members, such as flat plates 25, one for each face of the shaft. As here shown, each of these members or plates is integral with a support or plate 15' secured to one end of the sleeve 11'; and if desired their adjacent edges may be connected together to form a single hollow box-like structure. They are each slotted to form an oval-shaped or oblong ball-race which is substantially filled with balls; and the cut-out pieces 23' are secured to the sleeve as by screws 24'. The balls in one of the substantially straight portions of each race have bearing contact with the shaft and the sleeve, while those in the other straight portions and in all or substantially all of each curved portion of each race are out of bearing contact and are therefore free to travel in either direction as impelled by those balls which are in bearing contact; and as shown in Fig. 5, the balls preferably bear upon the shaft along and near two diagonally opposite edges thereof and therefore tend to hold the shaft from rotation relative to the sleeve. The interior face of the sleeve comprises four plane surfaces which, as indicated by the radial or diagonal plane lines 20', may be theoretically divided into four relatively narrow bearing surfaces 26, 27, 28 and 29 and two relatively wide arched portions 30 and 31, the latter being bounded respectively by each pair of said planes. It is obvious that the ball-cage shown in Fig. 5 which is provided with ball-races in the manner shown in this figure, would be equally applicable to a rounded shaft as well as to a rectangular shaft.

If the straight portions of the ball-races in any of the foregoing embodiments of my improvements are precisely parallel to the axis of the shaft in each case as shown in Figs. 1-6 inclusive, there will be a tendency resulting from the constant use of the bearing to wear grooves in the shaft along the bearing surfaces traversed by the balls; and this in turn may loosen up the bearing and destroy the exact fitting of the balls therein and eventually prevent the bearing from operating smoothly. To obviate this, the ball-races may be constructed so that the balls in bearing contact with the shaft will not all traverse the bearing surface of the shaft in the same straight line. This may be accomplished in either one of the two ways which I have illustrated in Figs. 8 and 9 which are developments respectively of the ball-circuits shown in Figs. 2 and 4 with the following changes. In Fig. 8 the straight portions 13' of the ball-race are inclined slightly from an axial direction. In Fig. 9 the straight portions 13'' are slightly curved so that in this case the ball-races comprise curved longitudinal portions and curved transverse portions connecting the ends of the longitudinal portions. By either inclining the straight longitudinal portions from an axial direction or curving them, in any bearing of this type, it will be readily seen that the balls in bearing contact with the shaft will not traverse the same straight line along the bearing surface of the shaft and will thus obviate the tendency to wear grooves in the shaft and thus will preserve smooth operation of the bearing indefinitely.

I claim as my invention:

1. A ball-bearing for shafts comprising a sleeve, a ball-cage within the sleeve having a single continuous ball-race consisting of an even number of axially disposed substantially straight portions and a like number of curved end portions connecting the ends of the straight portions, and balls substantially filling said race and characterized by this: that the inner face of the sleeve is formed from end to end with one-half said number of bearing surfaces which have arched portions between them likewise extending from end to end of the sleeve, that one-half said number of said straight portions of the race are in register respectively with said bearing surfaces of the sleeve, and that the other straight portions of the race and substantially all of each curved portion thereof lie within spaces defined by the arched portions of the sleeve and radial planes passing through the respective ends of said arched portions.

2. The ball-bearing defined in claim 1 in which the ball-cage comprises two members keyed respectively to the ends of the sleeve and having fingers which extend into the sleeve to form a continuous ball-race.

3. A ball bearing for linear motion comprising a sleeve, a ball retainer within said sleeve having axially-directed straight slots to guide the balls when under load and guide-ways communicating with the ends of said slots to guide the balls when relieved of the load, the said balls substantially filling both said slots and said guide-ways, and characterized by this: that the inner face of said sleeve is formed with relatively narrow raised portions extending from one end of said sleeve to the other to provide bearing surfaces for the balls under load and with relatively wide relieved portions between the raised portions and extending from one end of said sleeve to the other to provide clearance for the balls not under load.

4. A sliding anti-friction bearing for a shaft, comprising a sleeve, means within the sleeve and with which the sleeve cooperates to form one or more continuous ball-raceways having straight axially-directed portions and curved-end portions, and balls substantially filling said raceways but being under load in no more than one-half the number of straight portions of the raceways, the inner face of the sleeve being formed with bearing surfaces for the balls under load, which surfaces extend from end to end of the sleeve, and with arched portions alternating with said bearing surfaces, and the curved-end portions of the raceways lying within the areas defined by said arched portions.

JOHN B. THOMSON.

REFERENCES CITED

The following references are of record in the file of this patent:

UNITED STATES PATENTS

| Number | Name | Date |
|---|---|---|
| 2,452,117 | Ferger | Oct. 26, 1948 |

FOREIGN PATENTS

| Number | Country | Date |
|---|---|---|
| 755,957 | France | 1933 |